United States Patent [19]
Taguchi et al.

[11] Patent Number: 5,078,662
[45] Date of Patent: Jan. 7, 1992

[54] AUTOMATIC TRANSAXLE

[75] Inventors: Hiromi Taguchi, Zama; Hirofumi Okahara, Isehara; Kazuhiko Sugano, Yokohama, all of Japan

[73] Assignee: Nissan Motor Co., Ltd., Yokohama, Japan

[21] Appl. No.: 446,531

[22] Filed: Dec. 5, 1989

[30] Foreign Application Priority Data

Dec. 29, 1988 [JP] Japan ................ 63-331315
Dec. 29, 1988 [JP] Japan ................ 63-331316

[51] Int. Cl.⁵ .......................................... F16H 57/02
[52] U.S. Cl. ................................. 475/200; 74/606 R
[58] Field of Search ............... 475/198, 200, 206; 74/606 R

[56] References Cited

U.S. PATENT DOCUMENTS 4,223,566  9/1980  Yamamori et al. ............... 74/606 R
4,528,870  7/1985  van Deursen et al. ......... 475/200 X
4,823,637  4/1989  Taguchi et al. .................. 74/606 R
4,901,605  2/1990  Taguchi ...................... 74/606 R X

FOREIGN PATENT DOCUMENTS 58-196466  12/1983  Japan .

Primary Examiner—Dwight Diehl
Attorney, Agent, or Firm—Foley & Lardner

[57] ABSTRACT

In an automatic transaxle having an idler gear center axis below a line interconnecting a main power train center axis and a differential center axis, a control valve assembly is disposed on one of opposite sides of a transaxle case divided by the idler gear center axis. The differential is disposed on the other of the opposite sides of the transaxle. An oil storing chamber is disposed next to the control valve assembly and free from occupation by same. The oil storing chamber extends from one to the other of the opposite sides of the transaxle case.

5 Claims, 5 Drawing Sheets

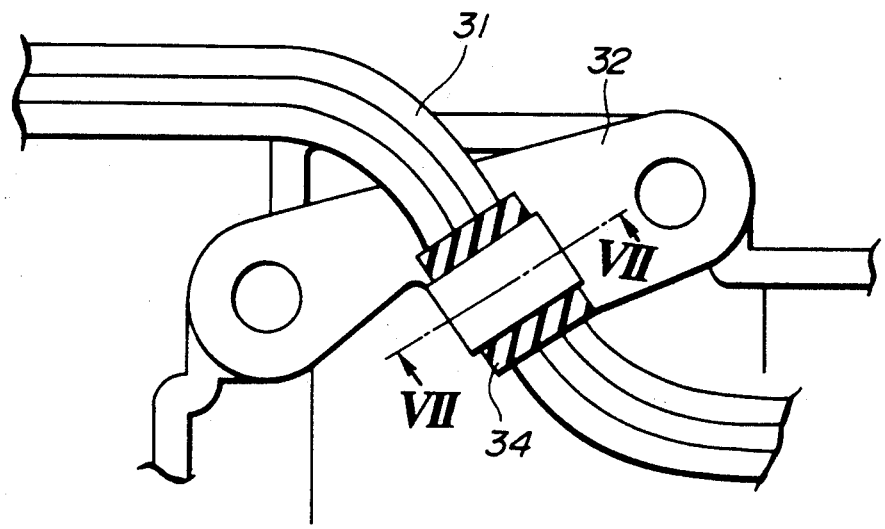
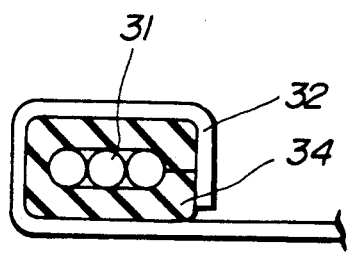
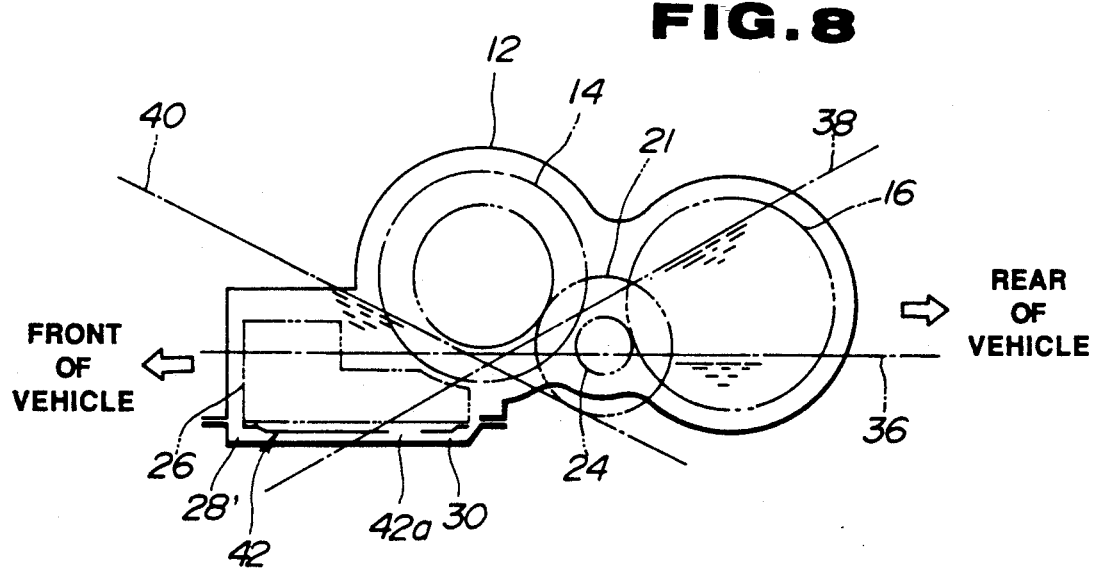

AUTOMATIC TRANSAXLE

BACKGROUND OF THE INVENTION

1. Field of the Invention

The present invention relates to an automatic transaxle for a front engine-front drive vehicle.

2. Description of the Prior Art

An example of a prior art automatic transaxle is disclosed in Japanese Utility Model Provisional Publication No. 58-196466.

In the prior art automatic transaxle, a control valve assembly is arranged so as to have a portion right under an idler or reduction gear, i.e., the control valve is arranged so as to extend over the opposite sides of a transaxle case divided by an idler gear center axis. In order to attain a desired ground clearance of a vehicle and a desired low level of an engine hood, it has been necessitated to design the control valve assembly and oil pan as thinner as possible, resulting in that an oil storing space is liable to become insufficient and an oil level is liable to become unsuitable.

SUMMARY OF THE INVENTION

In accordance with an aspect of the present invention, there is provided a novel automatic transaxle which comprises a main power train having a center axis, a differential having a center axis, an idler gear interposed between the main power train and the differential for transmission of power therebetween and having a center axis prallel to the center axes of the main power train and the differential, a transaxle case having installed therein the main power train, the differential and the idler gear, the transaxle case having opposite sides divided by the center axis of the idler gear, the differenital being disposed on one of the opposite sides of the transaxle case, and a control valve assembly disposed on the other of the opposite sides of the transaxle case.

In accordance with another aspect of the present invention, the automatic transaxle further comprises an oil storing chamber which is disposed next to the control valve assembly and free from occupation by same. The oil storing chamber extends from the aforementioned one side to the aforementioned other side of the transaxle case.

The above structure is effective for solving the above noted problems inherent in the prior art device.

It is accordingly an object of the present invention to provide a novel automatic transaxle which can increase the thickness of its control valve assembly without reducing the ground clearance of an associated vehicle and without making higher the level of the engine hood.

It is another object of the present invention to provide an automatic transaxle of the above described chracter which makes it possible to attain a space for storing oil without increasing the overall height thereof.

It is a further object of the present invention to provide an automatic transaxle of the above described character which makes it possible to attain a desired oil level under any driving condition of the vehicle.

It is a further object of the present invention to provide an automatic transaxle of the above described character which can assuredly prevent oil from interfering with its main power train and thereby prevent the temperature of oil from rising excessively high under any driving condition of the vehicle.

BRIEF DESCRIPTION OF THE DRAWINGS

FIG. 6 is an enlarged view of a clamp and its associated portion of the transaxle of FIG. 2;

FIG. 7 is a sectional view taken along the line VII—VII of FIG. 6; and

FIG. 8 is a view similar to FIG. 3 but shows an example having a problem to be solved by the present invention.

DESCRIPTION OF THE PREFERRED EMBODIMENTS

Figure 1:
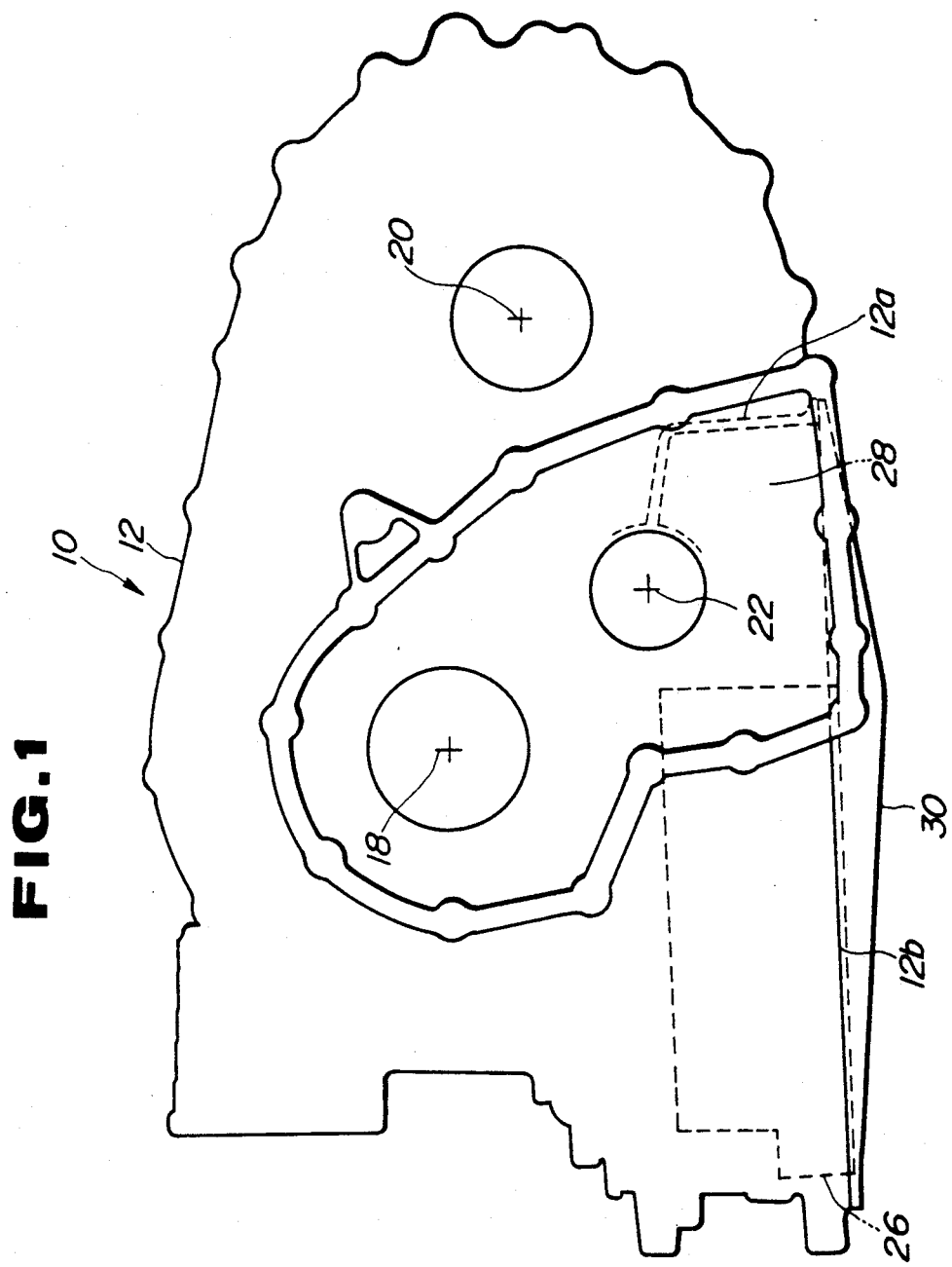
FIG. 1 is an elevational view of an automatic transaxle according to an embodiment of the present invention.

Referring to FIGS. 1-7, an automatic transaxle 10 according to an embodiment of the present invention includes a transaxle case 12 for receiving therein a main power train 14, a differential 16, etc.

A center axis of the main power train 14 is indicated by 18. A center axis of the differential 16 is indicated by 20. A center axis of a reduction gear or idler gear 21 is indicated by 22. An idler shaft or reduction shaft for installing thereon the idler or reduction gear 21 is indicated by 24. The center axes 18, 20 and 22 are parallel to each other. The center axis 22 of the idler gear of shaft 24 is arranged so as to be lower than a plane 25 interconnecting the center axes 18 and 20 of the main power train 14 and the differential 16 as best seen from FIG. 3.

The automatic transaxle 10 further includes a control valve assembly 26 consisting of an upper body 26a, middle body 26b and lower body 26c. The transaxle case 12 is formed with an attaching surface 12c to which the control valve assembly 26 is attached and fastened. The control valve assembly 26 is arranged forward of the reduction shaft 24 with respect to an associated vehicle body and in such a manner that the upper body 26a projecting into a place higher than the lower end of the reduction shaft 24. In other words, the control valve assembly 26 is arranged on one of opposite sides of the transaxle case 12 divided by the center axis 22 of the idler gear 22 or shaft 24, while on the contrary the differential 14 is disposed on the other of the opposite sides of the transaxle case 12.

The transaxle case 12 has at the lower end portion thereof an oil storing space or chamber 28 which is disposed next to the control valve assembly 26 and is not occupied by same. More specifically, the oil storing chamber 28 is arranged so as to extend nearly horizontally from one to the other of the opposite sides of the transaxle case 12 divided by the center axis 22 of the idler gear 21 or shaft 24, i.e., the oil storing chamber 28 extends from the control valve assembly 26 receiving side to the differential 16 receiving side of the transaxle case 12 divided by the center axis 22 of the idler gear 21 or shaft 24. The end of the oil storing chamber 28 on the differential 16 receiving side is defined by a wall 12a of the casing 12.

An oil pan 30 extends correspondingly to the oil storing chamber 28, i.e., the oil pan 30 is constructed and arranged so as to extend from one to the other of the opposite sides of the transaxle case 12 divided by the center axis 22 of the idler gear 21 or shaft 24. The oil pan 30 is attached to a lower end flange 12b of the transaxle case 12 to define the lower end of the storing chamber 28.

Figure 2:
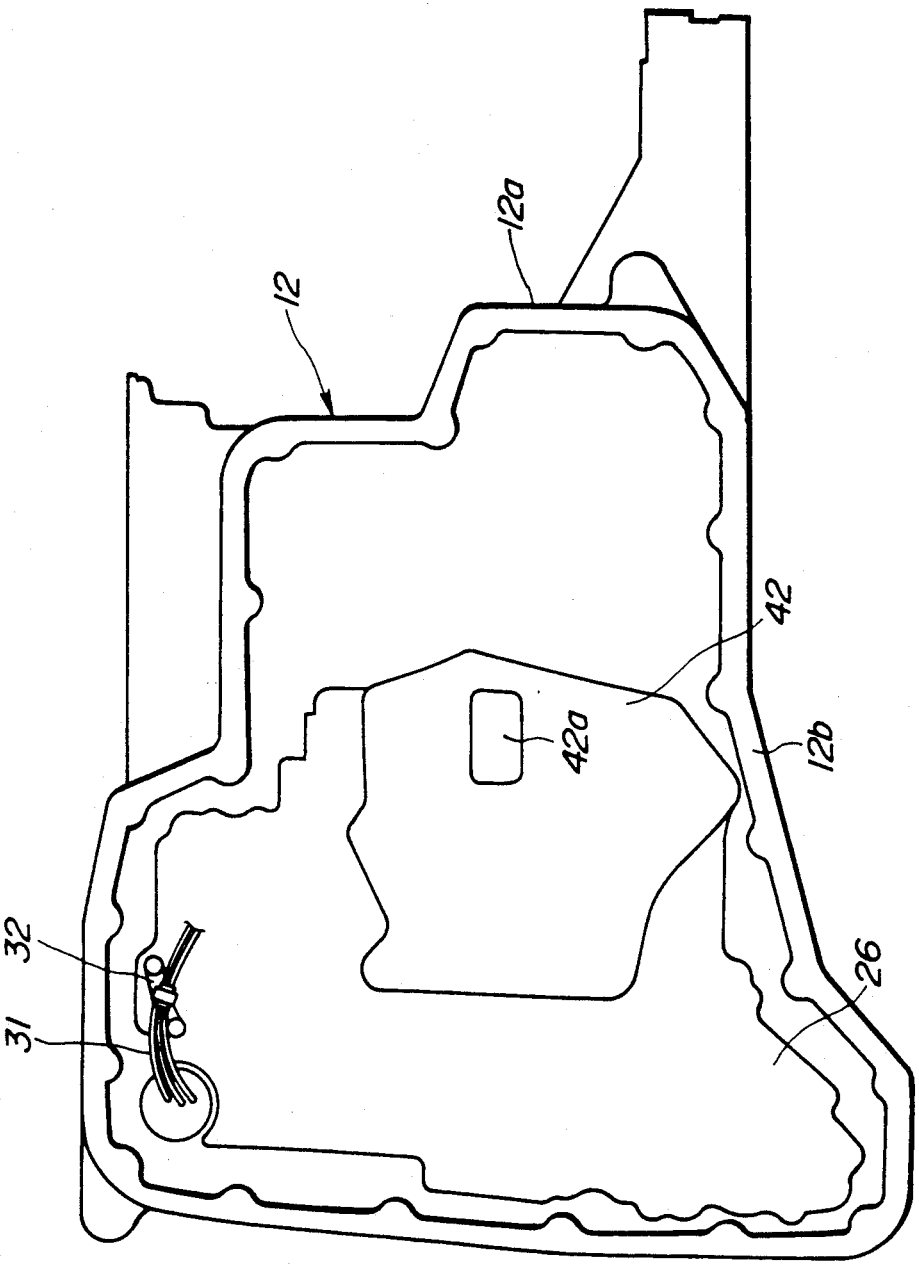
FIG. 2 is a bottom plan view of the automatic transaxle of FIG. 1.

In FIG. 2, a harness is indicated by 31 and attached to the control valve assembly 26 by means of a clamp 32. As shown in an enlarged scale in FIGS. 6 and 7, the clamp 32 is partially cut and bent so as to encircle the harness 31 by way of a rubber bushing 34 for thereby holding the harness 31 in place relative to the control valve assembly 26.

From the foregoing, it will be understood that the present invention makes it possible for the control valve assembly to be arranged generally higher than before relative to the lower end of the transaxle case or the control valve assembly attaching surface of the transaxle case. This makes it possible for the control valve to be thicker than before.

It will be further understood that the space on the side of the idler shaft opposite to the control valve assembly can be used as an oil storing chamber, thus making it possible to attain a desired oil level under any running condition of the vehicle. In this connection, explanation will be made hereinafter with reference to FIGS. 4 and 8.

FIGS. 8 shows an example in which an oil storing chamber 28' is provided which is mostly occupied by the control valve assembly 26. The oil storing chamber 28' is not extended from one to the other of the opposite sides of the transaxle case 12 divided by the center axis 22 of the idler gear 21 or shaft 24. In this example, 36 indicates an oil level when the vehicle is on a planar road surface, 38 indicates an oil level when the vehicle is on an uphill road or accelerated, and 40 indicates an oil level when the vehicle is on a downhill road or decelerated. The oil level 36 is inevitable in order to prevent an oil intake port 42a of an oil strainer 42 from being exposed to the open air to inhale air. The oil levels 36-40 are undesirable since they interfere with the main power train 14 to cause an excessively high temperature of oil. If the oil level 36 is lowered so as not to interfere with the main power train 14, the inlet port 42a of the strainer 42 may possibly be exposed to the open air to inhale air when the vehicle is on an uphill road or accelerated. This is undesirable.

Figure 3:
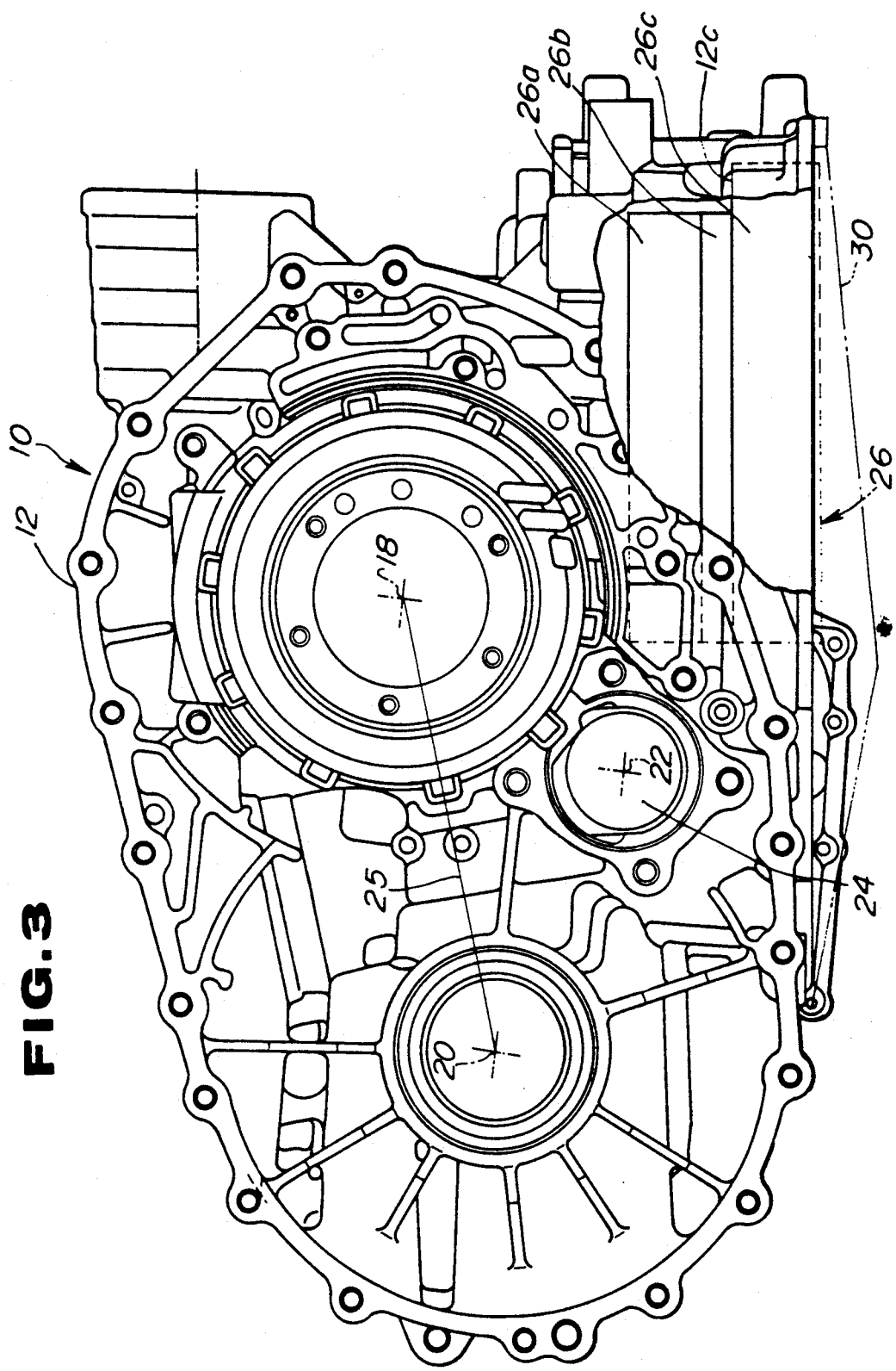
FIG. 3 is an elevational, partly broken-away view of a transaxle case and a control valve assembly of the transaxle of FIG. 1.
Figure 4:
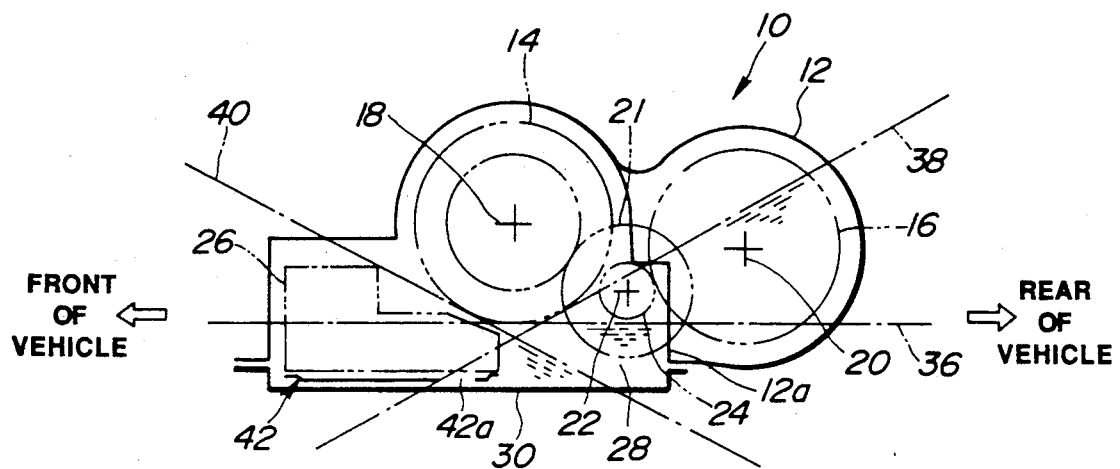
FIGS. 4 and 5 are a schematic elevational view and bottom plan view of the transaxle of FIG. 2, respectively.
Figure 5:
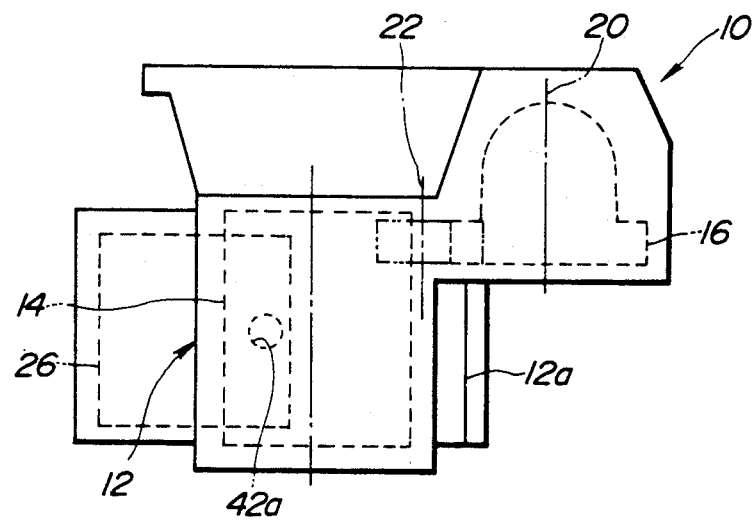

Referring to FIG. 3, the present invention makes it possible to attain the oil storing chamber 28 which is not occupied by the control valve assembly 26 and which extends from one to the other of the opposite sides of the center axis 22 of the idler gear 21 or shaft 24 since the control valve assembly 26 is arranged only on one side with respect to the idler shaft 24. By this, it becomes possible to store an increased quantity of oil in the lower end portion of the transaxle case 12, thus making it possible to lower the oil level 36 to such an extent that the oil levels 36-40 do not interfere with the main power train 14 and the inlet port 42a of the oil strainer 42 is not exposed to the open air even when the vehicle is traveling uphill or accelerated.

What is claimed is:

1. An automatic transaxle comprising:
a main power train having a center axis;
a differential having a center axis;
an idler gear interposed between said main power train and said differential for transmission of power there between and having center axis parallel to said center axes of said main power train and said differential;
said center axis of said idler gear being disposed lower than a plane interconnecting said center axes of said main power train and said differential;
a transaxle case having installed therein said main and said idler gear;
said transaxle case having opposite sides divided by said center axis of said idler gear;
said differential being disposed on one of said opposite sides of said transaxle case;
a control valve assembly disposed on the other of said opposite sides of said transaxle case; and
an idler shaft having installed thereon said idler gear, in which and lower than said center axis of said main power train at least a portion of said control valve assembly is disposed higher than a lower end of said idler shaft and lower than said center axis of said main power train.

2. An automatic transaxle as claimed in claim 1, further comprising an oil storing chamber which is disposed next to said control valve assembly and free from occupation by same, said oil storing chamber extending from said one side to said other side of said transaxle case.

3. An automatic transaxle as claimed in claim 2, further comprising an oil pan attached to said transaxle case, said transaxle case having a lower end portion which cooperates with said oil pan to define said oil storing chamber.

4. An automatic transmission:
a main power train having a center axis;
a differential having a center axis;
an idler gear interposed between said main power train and said differential for transmission of power therebetween and having center axis parallel to said center axes of the main power train and the differential;
said center axis of said idler gear being disposed lower than a plane interconnecting said center axes of said main power train and said differential;
a transaxle case having installed therein said main power train, said differential and said idler gear;
said differential being disposed on one of said opposite sides of said transaxle case;
a control valve assembly disposed on the other of said opposite sides of said transaxle case;
an idler shaft having installed thereon said idler gear, in which at least a portion of said control valve assembly is disposed higher than a lower end of said idler shaft; and
an oil storing chamber which is disposed next to said control valve assembly and free from occupation by the same, said oil storing chamber extending from said one side to said other side of said transaxle case.

5. An automatic transaxle as claimed in claim 2, further comprising an oil pan attached to said transaxle case having a lower end portion which cooperates with said oil pan to define said oil storing chamber.